(No Model.)
W. H. JORDAN.
ELECTRIC RAILWAY SIGNAL.
No. 497,408. Patented May 16, 1893.
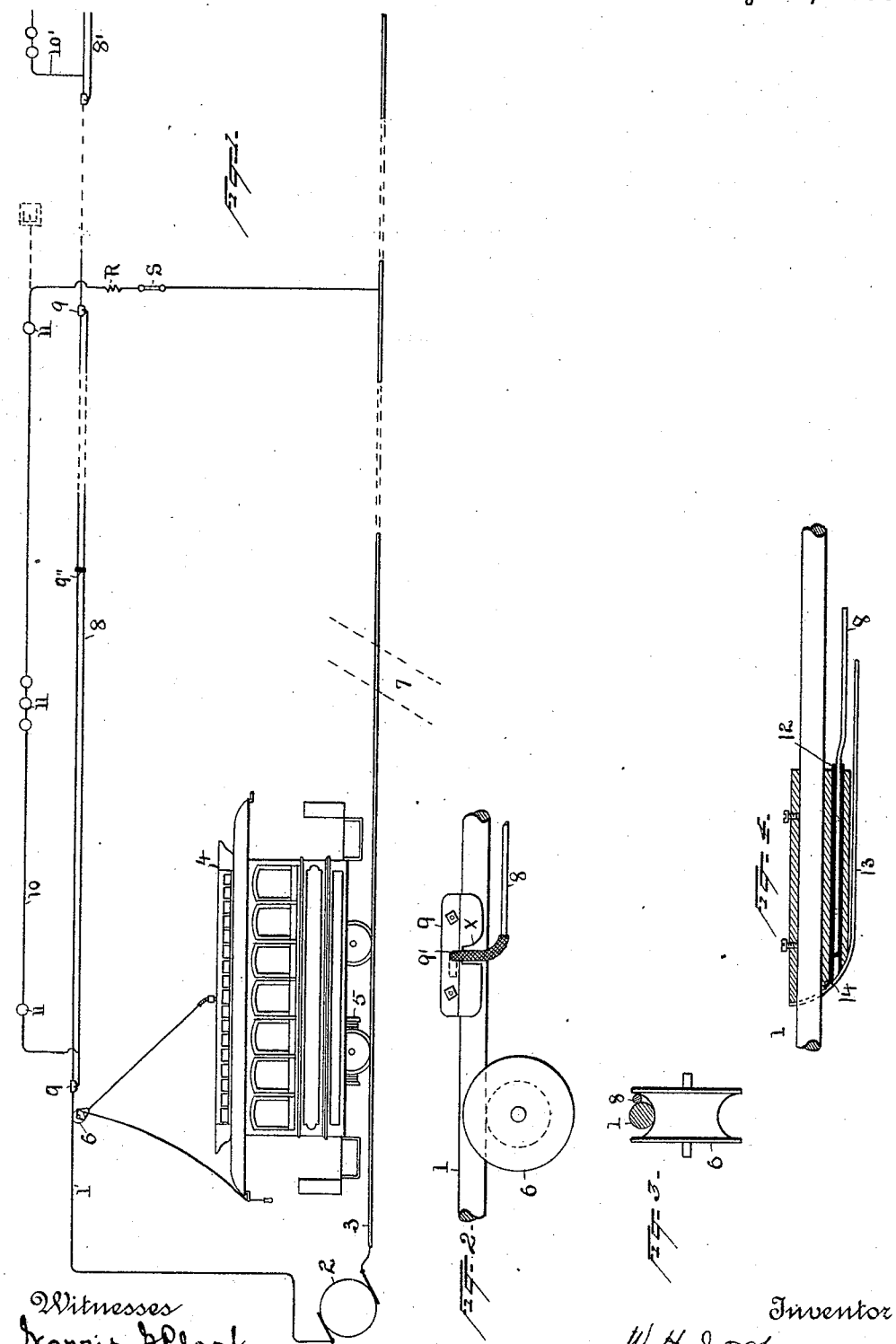

UNITED STATES PATENT OFFICE.

WILLIAM H. JORDAN, OF BROOKLYN, NEW YORK.

ELECTRIC-RAILWAY SIGNAL.

SPECIFICATION forming part of Letters Patent No. 497,408, dated May 16, 1893.

Application filed September 10, 1892. Serial No. 445,530. (No model.)

*To all whom it may concern:*

Be it known that I, WILLIAM H. JORDAN, a citizen of the United States, residing at Brooklyn, in the county of Kings and State of New York, have invented a certain new and useful Improvement in Electric-Railway Signals, of which the following is a specification.

The present invention relates to means for displaying signals, particularly at road crossings, which signals are illuminated, or otherwise operated, by being connected to a trolley or supply wire extending along a track or way on which vehicles are adapted to travel, the signal wire being preferably, but not necessarily, supported by the trolley wire and in close proximity thereto, but insulated therefrom, and in position to be connected to the trolley wire and maintained in connection therewith while the vehicle is passing a block or section and extending for a suitable distance on each side of the crossing or signal point.

The main objects of the invention are to reduce the expense of signals for crossings in connection with electric railways, and also to simplify the circuit connections and apparatus necessary to be employed.

In the accompanying drawings, Figure 1 is a diagrammatic view of a section of railway, with the improved signal circuits connected thereto. Fig. 2 is an enlarged view showing one of the clamps by means of which the signal wire and trolley wire are mechanically connected. Fig. 3 is a view showing how the trolley wire and the signal trolley wire are connected by the trolley wheel. Fig. 4 is a view showing a different device for connecting the trolley and signal wires.

1 represents a suitable trolley wire or main supplying conductor, extending from a stationary generator 2.

3 indicates the track of a railway, which preferably constitutes the return circuit to the generator 2.

4 is a car, having an electric propelling motor 5, which can be connected to the trolley wire by means of the trolley 6 in the usual manner.

7 indicates a road crossing the track. In close proximity to the trolley wire, for a considerable distance each side this crossing, is placed the auxiliary supply wire 8, hereinafter called the "signal trolley wire," which is preferably secured to the main trolley wire by the metal clamps 9, but is insulated therefrom by being surrounded with insulation 9' extending along the wire 8 far enough to keep it out of contact with wire 1 until it is raised by the trolley. The clamp is preferably cut away at X to allow wire 8 to extend down close to wire 1 so as to be in position to be reached by the trolley. One of these clamps is placed at each end of the wire 8, and at as many intermediate points as necessary to support the wire efficiently are placed supporting devices 9'' which mechanically (but not electrically) connect the wires 1 and 8 and prevent the latter from sagging unduly. The clamp is formed so that the trolley can ride over it easily, and so that the motor circuit will not be broken by disrupting the connection between the trolley wire and the trolley when the latter passes the clamp. The signal trolley wire is shorter than the wire 1, being used simply at localities where signals are necessary. As, or just after, the trolley passes the clamp, the wires 8 and 1 will be electrically connected by being brought together and by means of the trolley wheel. From the wire 8 extends a branch 10, in which are included any desired number of signal lamps or other devices, 11. In the drawings, five of these are shown, three directly at the crossing and one on each side at a distance therefrom. One end of this branch 10 is connected to the return conductor, (that is, the track 3) or directly to earth, as indicated in dotted lines at E. If found necessary, an artificial resistance R may be inserted in the branch 10, but this will not usually be necessary when five lamps are used in the branch, as indicated in the drawings.

The signal lamps will ordinarily be out of circuit and unlighted. As a car comes along, the trolley will connect the main trolley wire with the signal trolley wire when the car is, say, ten rods from the crossing, thus illuminating the lamps and retaining them illuminated until the car passes from the signal trolley wire at the opposite end, when the lamps will be thrown out of circuit and the trolley will make contact simply with the trolley wire and will continue to make contact therewith alone until the car reaches a position where it is necessary to give another signal, as indicated at the right of Fig. 1 by the branch 10' and signal trolley wire 8'.

With the arrangement of circuits and devices described, the signals are displayed by current derived directly from the generator supplying the motor on the car, and without a special signal generator. The amount of wire in the signal circuit is reduced to a minimum, since the main trolley wire is utilized as a large part of the circuit and the signal wires are simply used in localities where specially needed, and no complicated apparatus is employed.

It is evident that different means from those described may be employed for supporting the signal trolley wire, such for example as shown in Fig. 4, and that the wires are not necessarily placed over the car, as indicated in the drawings. If it is not desired to use the signals during the day, the signal circuit may be opened by any suitable switch S.

The clamp, in Fig. 4, is secured to the trolley wire 1, the signal trolley wire being also connected thereto, but being insulated therefrom by insulation 12.

13 is a spring or arm secured to the clamp at 14 and extending below the clamp and below the wire 8 as shown. The trolley in passing onto the clamp presses 13 against wire 8 closing the signal branch, and before 13 breaks contact with wire 8 said wire will be raised by the trolley as already described.

What I claim is—

1. In an electrical signaling system for railways, the combination of a main circuit, an auxiliary circuit, a signal circuit connected between said auxiliary circuit and the earth or other return of the main circuit, and means carried by a car for maintaining electrical connection between said main and auxiliary circuits, substantially as set forth.

2. In an electrical signaling system for railways the combination of a main circuit, an auxiliary circuit arranged in sections, a signal circuit connected between each section of said auxiliary circuit and the earth, or other return of the main circuit, and means carried by a car for maintaining electrical connection between said main and auxiliary circuits, substantially as set forth.

3. In an electrical signaling system for railways, the combination of a main circuit, an auxiliary circuit in close proximity to said main circuit and arranged in sections, a signal circuit connected between each section of said auxiliary circuit and the earth or other return of the main circuit, and means carried by a car for maintaining electrical connection between said main and auxiliary circuits, substantially as set forth.

4. In an electrical signaling system for railways, the combination of a main circuit, an auxiliary circuit in close proximity to said main circuit, a signal circuit connected between said auxiliary circuit and the earth or other return of the main circuit, and a trolley or contact arm, carried by a car for maintaining electrical connection between said main and auxiliary circuits, substantially as set forth.

5. In an electrical signaling system for railways, the combination of a main circuit, an auxiliary circuit in close proximity to said main conductor, and arranged in sections, a signal circuit connected between each section of said auxiliary circuit and the earth or other return of the main circuit, and a trolley, or contact arm, carried by a car for maintaining electrical connection between said main and auxiliary circuits, substantially as set forth.

6. In an electric railway system, having a main supplying conductor extending along the line of railway, the combination of an auxiliary conductor in close proximity to said main conductor, a signal circuit connected between said auxiliary conductor and the earth or other return circuit or the railway system, and means carried by a car for maintaining said auxiliary conductor in electrical connection with said main conductor for supplying current to said signal circuit, substantially as set forth.

7. In an electric railway system, having a main supplying conductor extending along the line of railway, the combination of an auxiliary conductor in close proximity to said main conductor and arranged in sections, signal circuits connected between each section of said auxiliary conductor and the earth, or other return of the railway system, and means carried by a car for maintaining one section of said auxiliary conductor in electrical connection with the main conductor for supplying current to the signal circuit connected with such section of the auxiliary conductor, substantially as set forth.

8. In an electric railway system, having a main supplying conductor extending along the line of railway, the combination of one or more lengths of auxiliary conductors supported in close proximity to said main conductor, a signal circuit connected between each length of auxiliary conductor and the earth, or other return of the system, and a single trolley, carried by a car for maintaining electrical connection between one of said lengths of auxiliary conductors and the main conductor for supplying current to a signal circuit connected with such length of auxiliary conductor, substantially as set forth.

9. The combination of a trolley wire of considerable length, and a comparatively short section of signal trolley wire, mechanically connected to the trolley wire but electrically insulated therefrom by means of suitable clamps, substantially as described.

10. The combination of a trolley wire, clamps thereon, a signal trolley wire supported by said clamps and connected or adapted to be connected to signal lamps or devices, and insulating material interposed between the trolley and signal wires, substantially as described.

11. The combination of a trolley wire, a signal trolley wire parallel therewith and in position to be connected therewith through an ordinary single trolley wheel, said signal wire being connected or adapted to be connected to signaling devices, substantially as described.

This specification signed and witnessed this 9th day of September, 1892.

WILLIAM H. JORDAN.

Witnesses:
CHARLES M. CATLIN,
EUGENE CONRAN.